(12) United States Patent
Imaoka

(10) Patent No.: US 8,218,184 B2
(45) Date of Patent: Jul. 10, 2012

(54) IMAGE FORMING APPARATUS AND IMAGE FORMING SYSTEM

(75) Inventor: Kunio Imaoka, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 578 days.

(21) Appl. No.: 12/429,583

(22) Filed: Apr. 24, 2009

(65) Prior Publication Data

US 2009/0290191 A1 Nov. 26, 2009

(30) Foreign Application Priority Data

May 22, 2008 (JP) ................................. 2008-134092

(51) Int. Cl.
*G06F 3/12* (2006.01)
*H04N 1/00* (2006.01)
*H04Q 5/22* (2006.01)

(52) U.S. Cl. ........................ 358/1.15; 358/400; 340/10.6

(58) Field of Classification Search .................. 358/1.15, 358/400; 340/10.6; 235/385; 455/13.3; 345/530

See application file for complete search history.

(56) References Cited

U.S. PATENT DOCUMENTS

| 7,812,981 B2 * | 10/2010 | Minami et al. ............... 358/1.15 |
| 2008/0151313 A1 * | 6/2008 | Ishimaru ....................... 358/400 |
| 2011/0254666 A1 * | 10/2011 | Ota et al. ...................... 340/10.6 |

FOREIGN PATENT DOCUMENTS

JP 11-17862 1/1999

* cited by examiner

Primary Examiner — Charlotte M Baker
Assistant Examiner — Rury Grisham
(74) Attorney, Agent, or Firm — Smith, Gambrell & Russell, LLP

(57) ABSTRACT

An image forming apparatus includes: a radio communication portion that transmits and receives data over radio communication to and from a storage medium in which identification information for user identification is stored; a display input portion that displays a function setting screen and receives a function setting; and a control portion that controls operation of the apparatus and forces the display input portion to perform a display changeover depending on an exposure state of the storage medium if the radio communication portion obtains the identification information from the storage medium.

11 Claims, 9 Drawing Sheets

IMAGE FORMING APPARATUS AND IMAGE FORMING SYSTEM

This application is based on Japanese Patent Application No. 2008-134092 filed on May 22, 2008, the contents of which are hereby incorporated by reference.

BACKGROUND OF THE INVENTION

1. Field of the Invention

The present invention relates to an image forming apparatus such as a printer, a facsimile, a copying machine and a multi-function machine that includes a radio communication portion which over radio communication reads data recorded on a recording medium such as an IC card and the like.

2. Description of Related Art

Because image forming apparatuses are going multi-functional in recent years, setting on a liquid crystal display of an operation panel is becoming complicated. For easy user operation, there are some image forming apparatuses in which a user can make a registration of a personal display setting on an operation panel or the like so as to allow a jump to a target setting screen with, for example, one-touch operation. On the other hand, in companies or public offices, from the viewpoint of cost, installation space and the like, not one for one person, but for example, one image forming apparatus such a printer, a copy machine, a multi-functional machine and the like is installed for each section or on an office floor and is shared with a plurality of persons.

However, in a case where an image forming apparatus is shared with a plurality of persons, if the persons each register freely their own special display settings, the number of display settings increases, and causes a problem that it becomes difficult to understand which setting is whose setting and other problems, thereby the display on the operation panel or the like becomes complicated and can lower visibility of the operation panel. Further, generally, because the number of registerable settings is limited, some users cannot register their own display settings. To solve these problems, for example, there is an image forming apparatus that is disclosed in JP-A-1999-017862.

Specifically, JP-A-1999-017862 discloses an image forming apparatus (FAX apparatus) that includes an image read means, an image transmission means, an operation means that reads an image and performs various mode settings for image transmission, a control means that controls the image read means and the image transmission means according to a setting on the operation means, a user ID recognition means, a user ID transmission means that transmits a recognized user ID to a server that stores personalize information, a personalize information acquisition means that from the sever, receives personalize information corresponding to the transmitted user ID, and a personalize means that personalizes the operation means. According to this structure, various settings are collectively saved in the server for each user and the settings are personalized, thereby the operability for users is improved (claim 1, paragraph [0173] of JP-A-1999-017862).

In the invention disclosed in JP-A-1999-017862, indeed displays for each user are changed on the operation panel by pushing a personalize key on an operation screen and the operability is improved. However, in the invention disclosed in JP-A-1999-017862, the screen display is personalized, but a display order and a display method are not dramatically changed for each user (see paragraphs [0065] and [0130] in JP-A-1999-017862). In other words, in displaying a function that a user wants to use, there is a problem that it is necessary to pass through a plurality of layers from an upper layer to a lower layer one after another as usual.

As described above, in the conventional image forming apparatus, although displays are changed for each user to some extent, it is impossible to jump to and quickly display a function setting screen that is frequently used and a function setting screen that is present on a relatively lower layer. Especially, in a multi-function machine that has a plurality of functions, to set completely different kinds of functions, it is necessary to take the trouble to return to the highest layer and go to a desired function setting screen, which raises a problem that it is difficult to quickly perform a function setting.

SUMMARY OF THE INVENTION

The present invention has been made to deal with the conventional problems, and has an object, in which depending on an exposure state in which a storage medium that stores identification information for identification of each user is exposed to a radio communication portion, a display changeover is performed based on display setting data that are set in advance being related to the identification information and set in advance. Thus, a function setting screen that is often used is quickly displayed, thereby improving operability and visibility for users.

To achieve the object, an image forming apparatus according to an embodiment of the present invention comprises: a radio communication portion that transmits and receives data over radio communication to and from a storage medium in which identification information for user identification is stored; a display input portion that displays a function setting screen and receives a function setting; and a control portion that controls operation of the apparatus and forces the display input portion to perform display changeover depending on an exposure state in which the storage medium is exposed if the radio communication portion obtains the identification information from the storage medium.

According to this structure, because display on the display input portion (e.g., an operation panel) is changed depending on an exposure state in which the storage medium is exposed to the radio communication portion, it is possible to change display on the display input portion without performing a complicated operation such as passing through layers on the display input portion and the like.

Besides, it is preferable that the image forming apparatus includes a storage portion for storing data, the display input portion receives registration and update input of display setting data that represents a display order and display contents which are changed according to an exposure state of the storage medium, the storage portion stores the display setting data for each user, and the control portion, based on the display setting data of a user identified by the identification information, forces the display input portion to change display depending on the exposure state of the storage medium. If display setting data that represents a display order and display contents is set for a function setting screen that each user frequently uses, because the display on the display input portion can be changed by using the identification information and the display setting data, it is possible for each user to selectively display only the function setting screen that the user frequently uses, jump to and display a setting screen on a lower layer or a completely different kind of function setting screen. Thus, an image forming apparatus that is highly convenient is provided.

It is preferable that the control portion forces the display input portion to change the display every time the storing medium is exposed to the radio communication portion, or the control portion forces the display input portion to keep changing the display during the time when the storing medium is exposed to the radio communication portion. Because the control portion forces the display input portion to change the display every time the storing portion is exposed to the radio communication portion, or because the control portion forces the display input portion to keep changing the display during the time when the storing portion is exposed to the radio communication portion, it is possible for the user to change the display without performing operation on the display input portion.

It is preferable that the control portion does not store the display setting data into the storage portion but forces the radio communication portion to store the display setting data into the storage medium, the radio communication portion obtains the identification information and the display setting data from the storage medium, the obtained display setting data are inputted into the control portion, and the control portion, based on the inputted display setting data, forces the display input portion to change the display depending on the exposure state of the storage medium. Because the control portion does not store the display setting data into the storage portion but forces the radio communication portion to store the display setting data into the storage medium, even if a different image forming apparatus is used, or even if the display setting data in the storage portion is lost because of a glitch or the like, it is possible for the user to display the function setting screen that the user frequently uses on the display input portion without reentering the display setting data on the display input portion.

It is preferable that the image forming apparatus includes an authorization portion, which based on the identification information which the radio communication portion obtains from the storage medium, determines whether or not the user has permission to use the image forming apparatus and there is a problem permitting the use, wherein the control portion holds the image forming apparatus in an unavailable state in principle, and puts the image forming apparatus into an available state if the authorization portion determines that there is no problem permitting the user to use the image forming apparatus. Because the authorization portion is included, which based on the identification information which the radio communication portion obtains from the storage medium, determines whether or not the user has permission to use the image forming apparatus, it is possible to give the authorization function to the image forming apparatus.

It is preferable that if the display input portion displays all setting screens including the last setting screen, the control portion forces the display input portion to perform successively the display again from the first setting screen. Thus, even if the display is erroneously changed, it is possible to easily reach a target setting screen again by simply exposing the storage medium.

It is preferable that the image forming apparatus is a multi-function machine that comprises some of a plurality of functions of copy function, print function, scan function, and FAX function, or all of the functions. Accordingly, even if a multi-function machine that has a plurality of functions and tends to be difficult to operate is used, it is possible for the user to perform a function setting easily and quickly.

It is preferable that the storage medium is an IC card, and the radio communication portion is a reader/writer that performs reading and writing of data from and to the IC card. Because an IC card as the storage medium is light and thin, it is possible to easily expose or keep exposing the IC card to a reader/writer.

An image forming system according to a second embodiment of the present invention comprises: a plurality of storage mediums which are capable of storing at least identification information for user identification and being carried by each user; a radio communication portion that transmits and receives data to and from the storage medium over radio communication; a display input portion that displays a function able to be set on a screen thereof and receives a function setting; and an image forming apparatus that includes a control portion for controlling operation of the apparatus; and a storage portion that is disposed inside or outside the image forming apparatus, wherein the display input portion receives registration and update inputs of display setting data that represent a display order in which display is changed according to an exposure state of the storage medium, the storage portion stores the display setting data for each user, and the control portion, based on the display setting data, forces the display input portion to change display depending on the exposure state of the storage medium if the radio communication portion obtains the identification information from the storage medium.

This structure is thought of as a single system that comprises a storage medium, an image forming apparatus according to the first embodiment of the present invention, and a storage portion and substantially identical to the image forming apparatus.

DESCRIPTION OF THE PREFERRED EMBODIMENTS

Hereinafter, an embodiment of the present invention is explained using FIGS. 1 to 9. Although the present invention is applicable to various image forming apparatuses, here, as an example, a multi-function machine 1 (which corresponds to an image forming apparatus) is explained, which includes a reader/writer 6 (which corresponds to a radio communication portion) that identifies a user by using an IC card 7 (which corresponds to a storage medium) and carries out non-contact communication with the IC card 7 to determine whether or not the user has permission to use the multi-function machine 1. Each aspect of structures and arrangements described in an embodiment does not limit the scope of the present invention and is a mere example.

[Overview of Image Forming Apparatus]

Figure 1:
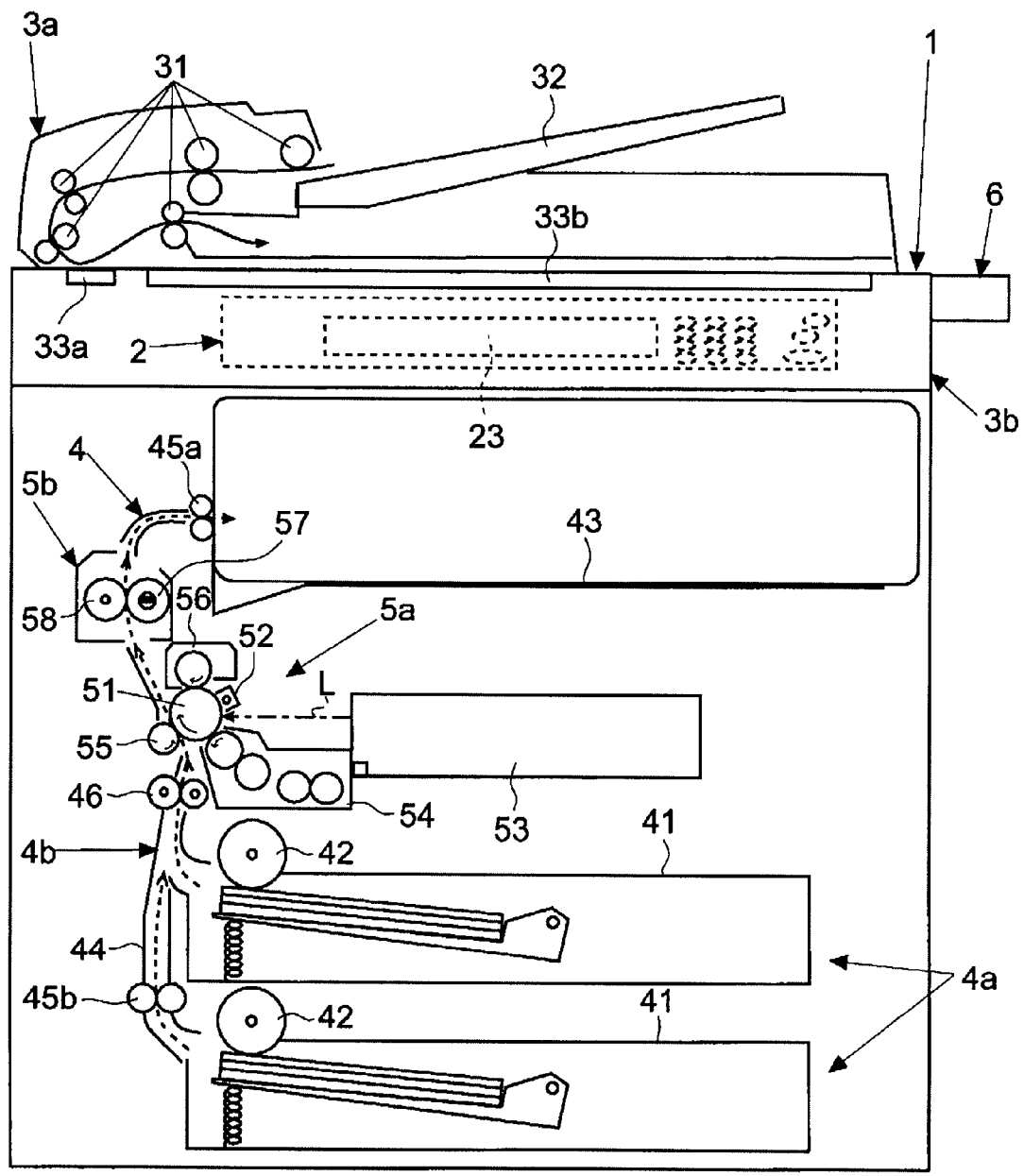
FIG. 1 is a schematic front sectional view of a multi-function machine according to an embodiment.

First, the multi-function machine 1 according to an embodiment of the present invention is explained based on FIG. 1. FIG. 1 is a schematic front sectional view of the multi-function machine 1 according to the embodiment of the present invention.

As shown in FIG. 1, the multi-function machine 1 according the embodiment includes a document feed device 3a on the highest portion, and is equipped with an operation panel 2, a document read portion 3b, a paper supply portion 4a, a feed path 4b, am an image forming portion 5a, a fixing portion 5b, a reader/writer 6 and others.

When copying documents, because of rotation of a plurality of pairs of document feed rollers 31, the document feed device 3a feeds automatically and successively the documents loaded on a document load tray 32 one after another to a contact glass plate 33a of the document read portion 3b. The document read portion 3b reads the documents that pass through the contact glass plate 33a and generates image data of the documents. Optical members (not shown) such as an exposure lamp, a mirror, a lens, an image sensor (e.g., a CCD) and others are disposed inside the document read portion 3b.

These optical members are used to shine light on a document fed from the document feed device 3a and on a document placed on the contact lens glass plate 33b, an output value from each pixel of the image sensor that receives reflected light from the document undergoes A/D conversion, image data are generated and the multi-function machine 1 is able to perform printing based on the image data obtained by the reading (copy function). The document feed device 3a is able to be rotated and lifted about a pivotal shaft disposed along a line behind the paper surface of FIG. 1, and after a document is placed on the contact glass plate 33b, the document feed device 3a holds the document down.

The paper supply portion 4a stores a plurality kinds of paper sheets (e.g., copy paper, plain paper, recycled paper, thick paper, various sheets such as OHP sheet and the like) and sends one sheet after another to the feed path 4b. The paper supply portion 4a comprises a cassette 41 on which paper to be stored is loaded, paper feed rollers 42 that rotate to send out paper sheets to the feed path 42, and the like. For example, in the time of printing, the paper feed rollers 42 rotate and paper sheets used for printing are sent to the feed path 4b one after another.

The feed path 4b is a pathway that is used to feed paper sheets from the paper feed portion 4a to an ejection tray 43. The image forming portion 5a and the fixing portion 5b are disposed in the paper feed route. The feed path 4b is provided with a guide 44 for guiding paper, pairs of feed rollers 45a and 45b that rotate when feeding paper, a pair of resist rollers 46 that force a paper sheet fed to wait before the image forming device 5a and sends out the sheet in synchronization with a timing of toner image forming, and the like.

The image forming portion 5a generates a toner image based on image data and transfers the toner image on a paper sheet fed. For this purpose, the image forming device 5a comprises a light-sensitive drum 51 that is supported rotatably in a direction indicated by an arrow shown in FIG. 1, an electrification device 52 disposed above the light-sensitive drum 51, a laser scan unit 53, a development device 54, a transfer roller 55, a cleaning device 56 and the like.

Toner generation and transfer processes are explained below. The light-sensitive drum 51 that is disposed in the substantially central portion of the image forming portion 5a and rotates in a predetermined direction is electrically charged to a predetermined potential by the electrification device 52 that is disposed at a diagonally right position above the light-sensitive drum 51 as shown in FIG. 1. In FIG. 1, the laser scan unit 53 is disposed near the right side of the electrification device 52, outputs laser light L based on image data, scans the surface of the light-sensitive drum 51 for exposure to form a latent image corresponding to the image data. As for image data, image data obtained by the document read portion 3b or image data transmitted from a user terminal 100 connected to a network or the like or from a communication party FAX machine 200 (see FIG. 2) are used.

In FIG. 1, the development device 54 that is disposed at a diagonally right position below the light-sensitive drum 51 supplies toner to the electrostatic latent image formed on the light-sensitive drum 51 to develop an image. The transfer roller 55 that is disposed left below the light-sensitive drum 51 is pressurized to the light-sensitive drum 51 to form a nip. A paper sheet is carried into the nip in synchronization with the timing with the toner image. When the paper sheet goes into the nip, an electric voltage is applied to the transfer roller 55 and the toner image on the light-sensitive drum 51 is transferred to the paper sheet. The cleaning device 56 removes toner remaining on the light-sensitive drum 51 after the transfer.

The fixing portion 5b fixes the toner image transferred to the paper sheet. The fixing portion 5b in the embodiment is constituted chiefly with a pressurization roller 58 and a heat roller 57 that incorporates a heating unit. The heat roller 57 and the pressurization roller 58 come into a tight contact with each other to form a nip. When a paper sheet passes through the nip, the toner on the paper sheet surface is heated to melt and fixed on the paper sheet. The paper sheet after the toner fixing is received by the ejection tray 43. Thus, the image formation (printing) is carried out in the time of using the copy function or the print function.

Although the details are described later, the reader/writer 6 is disposed on an right upper portion of the multi-function machine 1 in the embodiment. The reader/writer 6 uses an electric wave (electromagnetic wave) to perform radio communication with the IC card 7 (which corresponds to a storage medium) that stores identification information for identifying a user, thereby carrying out transmission and reception of data stored in the IC card 7. Because the reader/writer 6 has its own communication distance, a user puts (exposes) the IC card 7 within the communication distance to allow the reader/writer 6 to perform communication (reading or writing) with the IC card 7. Identification data that are data for recognizing and identifying the user who owns the IC card 7 is stored in the IC card 7. As the identification information, data for identifying each person such as an employee ID, a section name and the like can be used.

In practical use of the present invention, the reader/writer 6 obtains the identification information stored in the IC card 7 to identify a user. In the multi-function machine 1 in the embodiment, because the obtained identification information is used to perform use control of the multi-function machine 1, it is determined whether or not the owner of the IC card 7 has permission to use the multi-function machine 1 (the details are described later).

Figure 2:
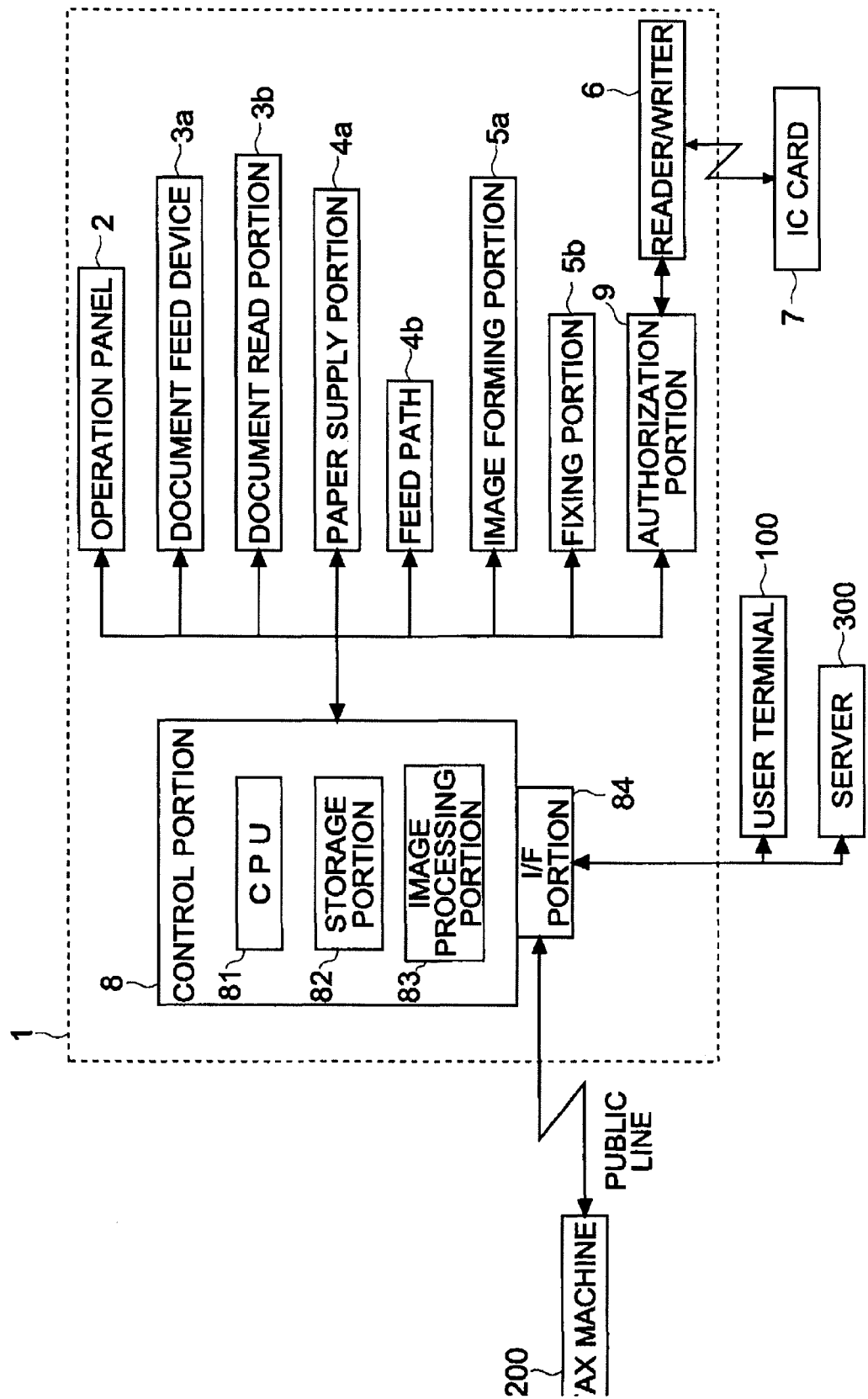
FIG. 2 is a block diagram showing a structural example of a multi-function machine according to an embodiment.

Next, a hardware structure of the multi-function machine 1 according to the embodiment of the present invention is explained based on FIG. 2. FIG. 2 is a block diagram showing a structural example of the multi-function machine 1 according to the embodiment of the present invention.

A control portion 8 is disposed in the multi-function machine 1. The control portion 8 controls operation of the multi-function machine 1 and is composed of, for example, a CPU 81, a storage portion 82 and the like. The CPU 81 is the central processing unit and controls each portion of the multi-function machine such as a liquid crystal display portion 23 and the like of the multi-function machine 1 based on control programs that are stored and executed in the storage portion 82. Besides the CPU 81, another CPU for display control of the operation panel 2 may be built into the operation panel 2 or the like. An image processing portion 83 applies various image processing operations to image data for printing and to image data that are transmitted to the user terminal 100 or the communication party FAX machine 200.

The storage portion 82 is able to be constituted by a combination of a non-volatile storage device and a volatile storage device such as a ROM, a RAM, a HDD and the like. Various data such as the control programs of the multi-function machine 1, control data, setting data, image data and the like can be stored in the storage portion 82.

The present invention has a feature in that if the reader/writer 6 obtains identification information from the IC card 7, the control portion 8 performs a display changeover on the operation panel 2 depending an exposure state of the IC card 7. The storage portion 82 is able to store the first display on the liquid crystal display portion 23 that is carried out in the time of obtaining identification information, and data that represent the contents and an order of changed display (hereinafter, called "display setting data") relating the information and data to each user. Although the details are explained later, the operation panel 2 accepts registration and update inputs of display setting data.

The control portion 8 is connected to portions such as the operation panel 2, the document feed device 3*a*, the document read portion 3*b*, the paper supply portion 4*a*, the feed path 4*b*, the image forming portion 5*a* and the fixing portion 5*b* over signal lines, and controls operation of each portion of the multi-function machine 1.

Besides, the control portion 8 is connected to an I/F portion 84 (an interface portion) that comprises various connectors, sockets and the like. The I/F portion 84 is connected to a plurality of user terminals 100 and communication party FAX machines 200 over a network or a public line, and is able to transmit image data to the user terminal 100 and the communication party FAX machine 200 (an Internet FAX may be used) (the scanner function and the FAX function). Besides, the I/F portion 84 is able to perform printing based on image data transmitted from the user terminal 100 and the communication party FAX machine 200 (the printer function and the FAX function). In other words, the multi-function machine 1 has a plurality of functions of the copy function, the printer function, the scan function, and the FAX function. In addition, by using the I/F portion 84, it is possible to connect the multi-function machine 1 to a server 300 in a network and store, for example, display setting data for each user in the server 300.

In the present invention, an authorization portion 9 is connected to the control portion 8. The authorization portion 9 can be achieved as hardware or software with the CPU 81, the storage portion 82 and programs of the control portion 8. In the embodiment, the authorization portion 9 is explained as a piece of hardware separate from the control portion 8.

The reader/writer 6 is connected to the authorization portion 9. The authorization portion 9 compares identification information that is stored in the IC card 7 and is obtained by the reader/writer 6 with the data ("authorization data") that the authorization portion 9 has and uses to determine whether or not it is possible to use the multi-function machine 1 (whether or not the user has permission to use the multi-function machine 1), and determines whether or not it is available. For example, the authorization portion 9 stores the identification information, as the authorization data, stored in all the IC cards that the users having use permission. In authorization operation, the authorization portion 9 checks whether or not there is authorization data identical to the identification information obtained from the IC card 7. In other words, based on the identification information in the IC card 7, the authorization portion 9 determines whether or not the user has use permission and there is a problem to give permission to the user to use the multi-function machine 1.

Here, the control portion 8 of the multi-function machine 1 according to the embodiment keeps the multi-function machine 1 in an unavailable state in principle. For example, in the unavailable state, even if operation or input for copy or FAX transmission is carried out on the operation panel 2, the control portion 8 does not accept such operation command input. Besides, if image data are transmitted from the user terminal 100, the image data is temporarily stored in the storage portion 82 but printing is not performed. Thus, it is possible to limit use permission to only authorized users, identify the users, and carry out use control of the multi-function machine 1.

And, an authorization result that represents no problem giving use permission to the user is sent to the control portion 8 together with the information (e.g., the identification information) for identifying the user. The control portion 8 receives the authorization result and puts the multi-function machine 1 into an available state. In other words, if an authorization result representing that the owner of the IC card 7 has use permission is transmitted from the authorization portion 9 (the IC card 7 proves to be owned by the user who has use permission), the multi-function machine 1 becomes available. For example, in the available state, the user is able to copy, scan, and perform FAX transmission with the multi-function machine 1. In addition, after it is confirmed that the IC card 7 owned by the user who uses the user terminal 100 and sends the image data is exposed to the reader/writer 6, printing of the image data that are temporarily stored is started. In the time the multi-function machine 1 is used, the control portion 8 obtains the user name, the function used, the number of paper sheets used for printing, the date and time of the use and saves the use record into the storage portion 82 or the like.

[Structures of the Reader/Writer 6, the IC Card 7 and the Authorization Portion 9]

Figure 3:
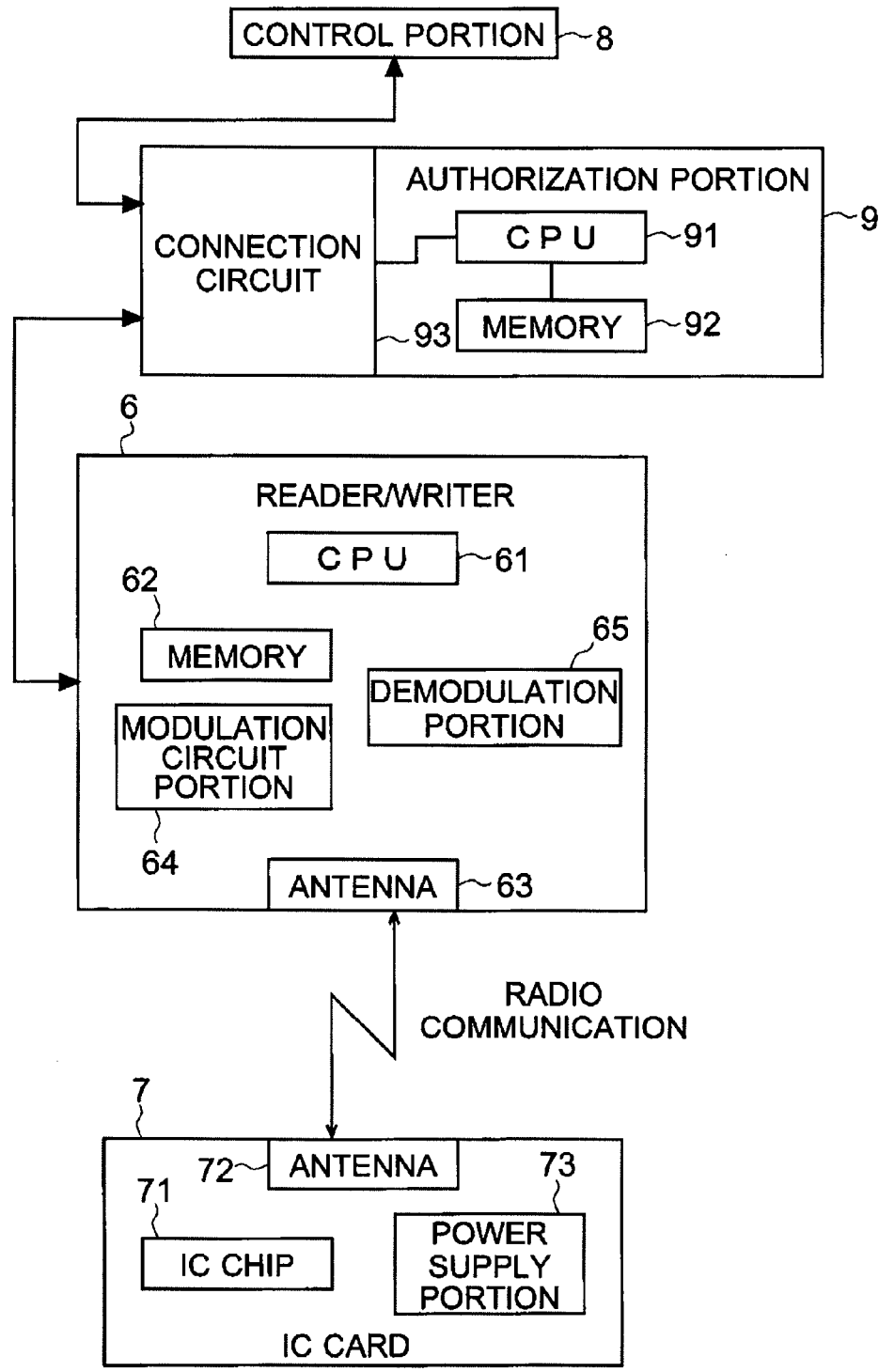
FIG. 3 is a block diagram showing structural and connection examples of an authorization portion, a card reader, and an IC card according to an embodiment.

Next, the reader/writer 6, the IC card 7 and the authorization portion 9 in the embodiment of the present invention are described in detail based on FIG. 3. FIG. 3 is a block diagram showing structural and connection examples of the authorization portion 9, the card reader 6, and the IC card 7 according to the embodiment of the present invention.

As shown in FIG. 3, in the multi-function machine 1 according to the embodiment, the authorization portion 9 is connected between and in series with the control portion 8 and the reader/writer 6. Thus, an authorization system for the IC card 7 is structured. Hereinafter, each component is described. The multi-function machine 1 is equipped with the reader/writer 6. The reader/writer 6 performs radio communication with the IC card 7 over an electromagnetic wave (an electric wave). The reader/writer 6 is equipped with a CPU 61, a memory 62, an antenna 63, a modulation circuit portion 64, a demodulation portion 65 and the like.

The CPU 61 controls operation of the reader/writer 6 and performs transmission control and various operations by using control programs and control data that are stored in the memory 62. The antenna 63 emits an electromagnetic wave (an electric wave) and receives an electromagnetic wave (a reflected wave and the like) from the IC card 7 for radio communication with the IC card 7. The modulation circuit portion 64 modulates a carrier wave to put a signal wave on the carrier wave and sends out the modulated wave. The modulation circuit portion 64 performs amplitude modulation, frequency modulation, phase modulation and the like that are in conformity with modulation/demodulation which is employed for the communication between the reader/writer 6 and the IC card 7. The demodulation portion 65 demodulates a signal wave from the IC card 7 and obtains data signals such as identification information and the like transmitted from the IC card 7.

Next, the IC card 7 that stores identification information used for user identification is explained. The IC card 7 includes an IC chip 71 that incorporates a control operation circuit, a modem circuit, a memory and the like, an antenna 72 and a power-supply source 73. The IC chip 71 stores at least identification information. The IC card 7 receives a command from the reader/writer 6 over radio communication and transmits identification information stored in the IC chip 71 to the reader/writer 6. As the IC card 7, it is possible to use a passive-type IC card, which receives a carrier wave transmitted from the reader/write 6, rectifies the wave by using the power-supply source 73, uses the rectified wave as a power supply voltage to drive the IC chip 71, puts stored data on a reflected wave and transmits the data via the antenna 72 to the reader/writer 6.

The IC card 7 is also able to receive data and a command from the reader/writer 6 and perform writing and update of data in the memory of the IC chip 71. In this case, the reader/writer 6 serves as a writer. Display setting data for each user may be stored in the IC card 7. In other words, display setting data are transmitted to the IC card 7, and the IC card 7 is able to store the display setting data into the memory of the IC chip 71.

The authorization portion 9 that is connected to the reader/writer 6 and the control portion 8 comprises a CPU 91, a memory 92, and a connection circuit 93, and is able to carry out transmission and reception of data to and from the reader/writer 6 and the control portion 8. The CPU 91 controls operation of the authorization portion 9. The memory 92 stores control programs for control of the authorization portion 9, authorization data and the like. The CPU 91 compares identification information stored in the IC card 7 that is read by the reader/writer 6 and is transmitted to the authorization portion 9 with the authorization data that is stored in the memory 92, and determines whether or not there are data of the authorization data that are identical to the identification information. If there are data identical to the identification information, the CPU 91 transmits a signal representing use permission of the multi-function machine 1 and the user identification information such as the identification information identical to the authorization data to the control portion 8.

Figure 4:
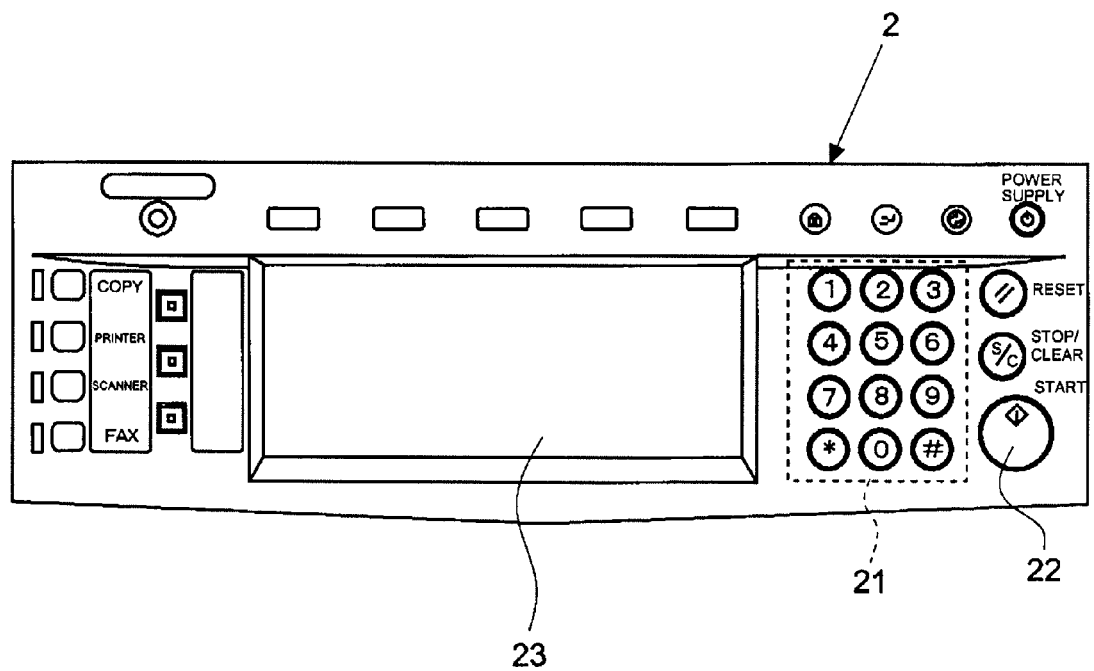
FIG. 4 is a view showing an example of an operation panel of a multi-function machine according to an embodiment.

[Use Registration of the Multi-function Machine 1 and Setting of Display Setting Data] Next, registration and setting of display setting data for allowing the use of the multi-function machine 1 according to the embodiment of the present invention are explained based on FIG. 4. FIG. 4 shows an example of the operation panel 2 of the multi-function machine 1 according to the embodiment of the present invention.

As shown in FIG. 4, the operation panel 2 disposed on a front upper portion of the multi-function machine 1 comprises a ten-key portion 21 and various keys for inputting and setting such as a start key 22 and the like. Besides, the operation panel 2 comprises a liquid crystal display portion 23 that displays operation states and various messages of the apparatus, and allows various settings and mode selection and the like through a touch panel. In other words, the operation panel 2 displays a function setting screen and accepts a function setting. The details of the kinds of functions that can be set are described later.

By operating the operation panel 2, for example, a personal identification number is inputted and a new registration or an update of the user having use permission is able to be performed. In this case, various kinds of data (e.g., the user name, the ID number, the user's section, the address of the user terminal 100, the permission to use a function and the like) for identifying the user that uses the multi-function machine 1 are inputted on the operation panel 2. Identification information is generated from the various data, the generated identification information is added to the information in the storage portion 82 and the information in the memory 92 of the authorization portion 9 as authorization data. Besides, the reader/writer 6 is used as a card writer and the identification information is stored into the IC card 7 or is used to update the information in the IC card 7. In other words, it is possible to newly register the IC card 7. In a case where the IC card 7 is already used as an employee card in a company or a personal ID card, an operation may be performed, in which the reader/writer 6 reads the employee card or the personal ID card, and the information read is stored into the storage portion 82 and the memory 92 of the authorization portion 9 as authorization data. Thus, it is possible to control the use of the multi-function machine 1 without preparing a new IC card 7.

Next, a function that is able to be set on the operation panel 2 shown in FIG. 4 is explained. In the multi-function machine 1 according to the embodiment, the user can display a setting screen for each function on the liquid crystal display portion 23, select and set various functions by operating buttons, keys and the like displayed on each setting screen. Because there are so many screens and functions that can be set, they are not shown in drawings for convenience, and functions that can be set are only listed.

When the multi-function machine 1 is used as a copying machine, for example, the user can set the following functions through input operation on a setting screen displayed on the liquid crystal display portion 23: quality check function of image data on document (letters, pictures, letters and pictures), copy density change function (manual adjustment, automatic density adjustment), automatic paper selection function (equal size, different size), automatic magnification selection function, equal-size copy function, enlargement/reduction (zoom), copy function, fixed magnification function, length/width separate change function, eco-printing function, binding margin function, center move function, frame erase function, one-side copy function, both-side copy function (one side to both side, both side to both side, spread to both side), divisional copy function (both side to one side, spread to one side), brochure function, covering function, OHP slip sheet print function, paper selection function, document set direction check function, document size selection function (same, mingled), sort function, sorted copy function, black/white inverse function, mirror image print function, page numbering function, image combination function, collective function (2 in 1, 4 in 1 and the like), write margin function, continuous read and lump print function, trial copy function, re-copy function, from management function (form registration), shared box function to store image data, job combining box function, interruption print function, management function (counting the number of paper sheets and the like), staple function and punch setting function in a case where a post-processing apparatus (a finisher) is disposed.

When the multi-function machine 1 is used as a printer, for example, the user can set the following functions through input operation on a setting screen displayed on the liquid crystal display portion 23: status print function for printing the number of total printed paper sheets and the like of the multi-function machine 1, connection setting function of the I/F portion 84 to set connection between the multi-function machine 1 and the user terminal 100 (parallel, serial, communication speed, IP address and the like), emulation function, use font setting function, function for print environment (the number of paper sheets to be used, paper-sheet size, enlargement/reduction, print area enlargement and the like), function for print quality (smoothing function, eco-print, resolution and the like), function for paper sheet (size, paper feeder, both-side print available/unavailable and the like), use setting function for storage devices such as a RAM, a HDD, a memory card and the like incorporated in the multi-function machine 1, and management function (counting the number of paper sheets and the like).

When the multi-function machine 1 is used as a scanner, for example, the user can set the following functions through input operation on a setting screen displayed on the liquid crystal display portion 23: document size confirmation function, transmission size selection function, read resolution selection function, function for confirming document set direction, file saving type selection function, function for read image quality (read density, color mode selection, image data reduction ratio, document image quality of pictures, letters and the like), divide function, frame erase function, each page output function, continuous read function, file name input function, center move function, destination selection function, destination registration function, password function, E-mail transmission function, and communication-party reception confirmation function.

When the multi-function machine 1 is used as a FAX machine, for example, the user can set the following functions through input operation on a setting screen displayed on the liquid crystal display portion 23: user-station information registration function (FAX number, ID and the like), direct transmission function, memory transmission function, rotation communication function (transmission, reception), lump transmission function, F-code communication function, reception function in paper run-out time, simplified number function, document density selection function, document size specification function, destination selection function, destination registration function, one-touch dial function (transmission, registration, change), redial function, both-side transmission function, enlargement/reduction transmission function, transmission reservation function, successive group communication function, interruption transmission function, time-specified communication function, polling communication function, relay transmission function, received image data forward function, encrypted communication function, management function (limiting transmission, counting the number of paper sheets and the like), communication result notice function, paper-sheet size confirmation function, collective function (2 in 1 and the like), and both-side receive function.

Figure 5:
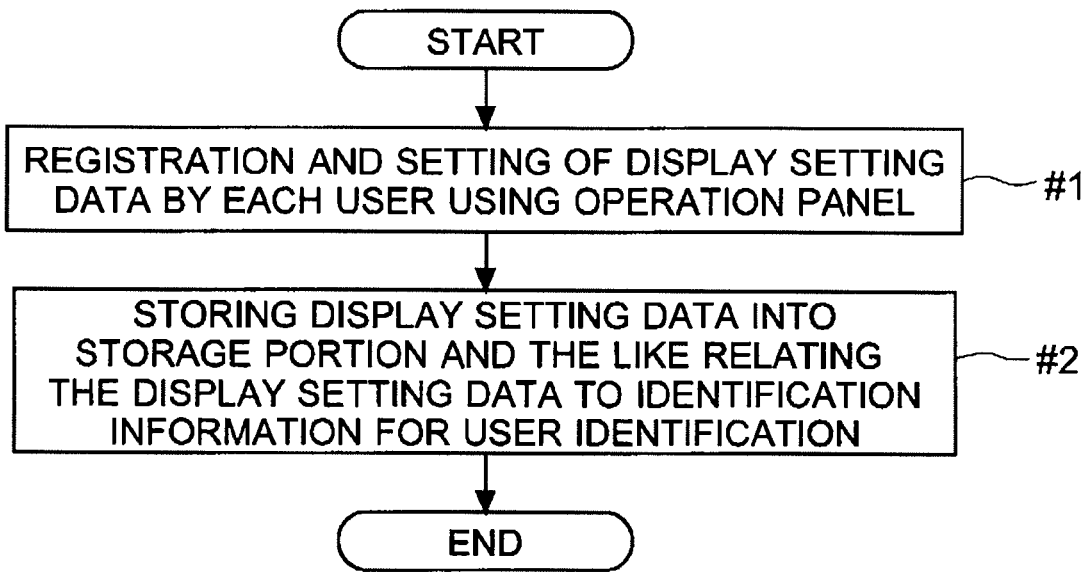
FIG. 5 is a flow chart showing a control example in which a display setting registration is performed on a liquid crystal display portion when a proper IC card according to an embodiment is exposed.
Figure 6:
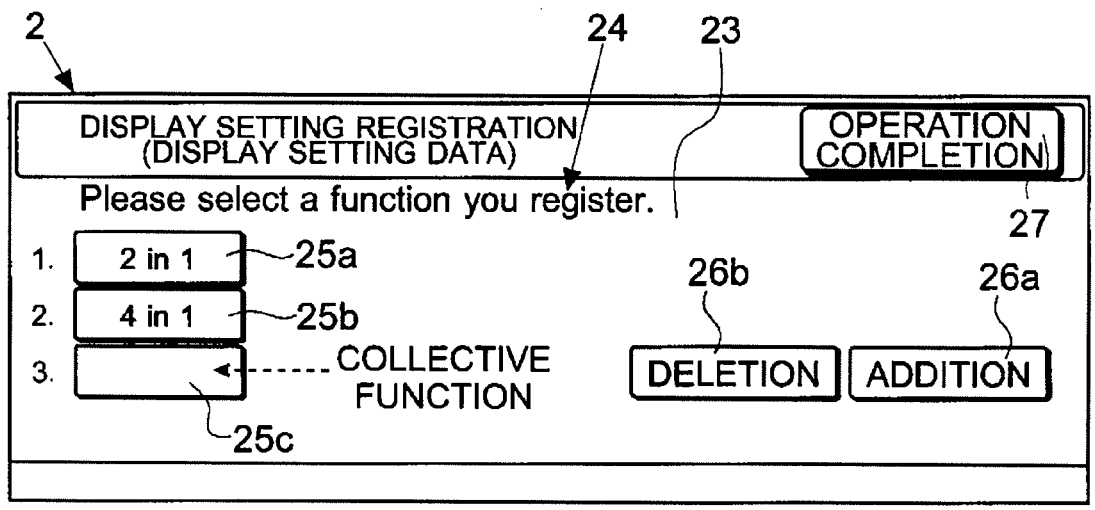
FIG. 6 is a view to explain a display example on a liquid crystal display portion according to an embodiment.
Figure 6:
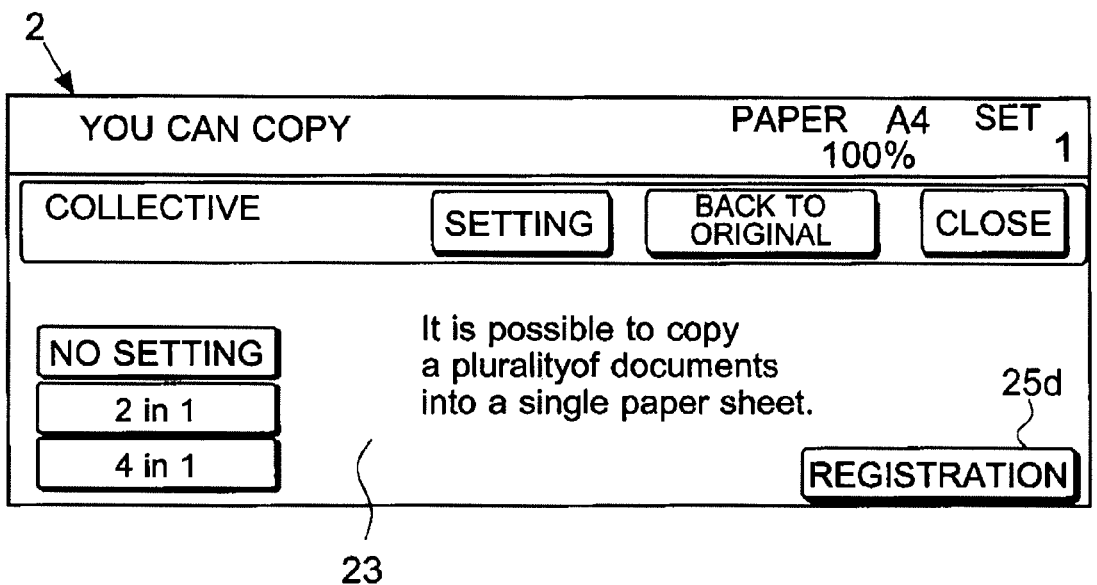

Next, display setting registration on the operation panel 2 (the liquid crystal display portion 23) in the time a proper IC card 7 is exposed to the reader/writer 6 according to the embodiment of the present invention is explained based on FIGS. 5 and 6. FIG. 5 is a flow chart showing a control example in which a display setting registration is performed on the liquid crystal display portion 23 when a proper IC card 7 according to the embodiment is exposed. FIG. 6 is a view to explain a display example on the liquid crystal display portion 23 according to the embodiment of the present invention.

In the multi-function machine 1 in the embodiment, as described above, based on a setting by the user, the display screen on the liquid crystal display portion 23 is changed depending on an exposure state of the IC card 7. Various settings for the changed display screen such as setting of contents to be displayed on the changed display screen, a display order and the like can be performed by using the operation panel 2.

First, a method of changing and setting a display screen (a method of setting display setting data) is explained with reference to FIGS. 5 and 6. At the time of "START" shown in FIG. 5, the multi-function machine 1 is available, and a command for changing a display screen is inputted into the operation panel 2 and the liquid crystal display portion 23.

Here, as shown in FIG. 6A, a screen for a display changeover setting is displayed on the liquid crystal display portion 23 (the step #1). On a display changeover setting screen 24, a function that is already registered is displayed in a box 25. As shown in FIG. 6A, data are registered in two boxes 25a and 25b of the three boxes 25, and the data are used to display setting screens that correspond to functions, that is, "2 in 1 function" (2 pages into 1 paper sheet) and "4 in 1 function" (4 pages into 1 paper sheet) and are present on lower layers of screens for setting collective functions which print image data formed on a plurality of documents onto one paper sheet. Numbers are indicated at the left sides of the three boxes 25. These numbers represent a display order (display priority). In other words, for the user who uses these functions, when the IC card 7 is exposed to the reader/writer 6, the setting screen corresponding to the "2 in 1 function" is displayed first on the liquid crystal display portion 23, and then the setting screen corresponding to the "4 in 1 function" is displayed depending on the exposure state of the IC card 7.

For example, if the user desires to register data for displaying a collective-function setting screen (a layer higher than those for the "2 in 1 function" and the "4 in 1 function"), the user pushes down an additional box 26a. Then, as shown in FIG. 6A, an empty box 25c newly appears. If the empty box 25c is pushed down, the display on the liquid crystal display portion 23 is changed to an initial display (the setting screen present on the highest layer), and the user repeats the pushing down to pass through layers and reaches a collective-function setting screen as shown in, for example, FIG. 6B. Here, for example, a registration box 25d is displayed at the right below corner of the liquid crystal display portion 23. If the user pushes down the registration box 25d for registration, words, for example, "collective function" are displayed on the box 25c, thereby a third display screen is registered. Thereafter, it is possible to return to the screen shown in FIG. 6A and register successively a setting screen to be displayed.

The setting screens for functions have no limit, and any setting screens for functions relating to copy, printer, scan, and FAX can be registered and stored. After completion of the registration of setting screens, a completion box 27 is pushed down.

A deletion box 26b shown in FIG. 6A is used to delete each box 25 that is set. For example, to prohibit the display of the setting screen for the "4 in 1," the box 25b is pushed down on the display changeover setting screen 24, then the deletion box 26b is pushed down. Thus, the box 25b is deleted from the display changeover setting screen 24, the box 25c is moved upward to the second position and displayed. Thereafter, the display setting data are updated and the setting screen for the "4 in 1" is not displayed when the IC card 7 is exposed to the reader/writer 6.

When the user inputs the display setting data (the contents and display order of the setting screens) through the operation panel 2 and uses the multi-function machine 1, the display on the liquid crystal display portion 23 is changed to "2 in 1," "4 in 1," and "collective function" in order depending on the exposure state of the IC card 7 to the reader/writer 6. In other words, considering the use frequency and the like of functions, the user registers the function setting screens and display order (priority) to be changed and displayed, thereby it is possible to reach quickly and easily a target function setting screen that is highly frequently used.

As described above, each user uses the operation panel 2 (the liquid crystal display portion 23) and performs the setting and registration (registration of display setting data) of the display and display order that is displayed on the liquid crystal display portion 23 in the time of authorization (the step #1). The registered setting contents are transmitted as the display setting data to the control portion 8 and stored into the storage portion 82 and the like corresponding to the identification information for user identification (the step #2). Here, the display setting data may be stored into the server 300 connected to the multi-function machine 1 corresponding (being related) to the identification information, or may be stored into the IC card 7 of the setter via the reader/writer 6. In other words, it is possible to store the display setting data into any one of the storage portion 82, the server 300, and the IC card 7, or into all of them. After the display setting data are stored, the setting and registration of the display setting data is completed (END).

[Specific Display Changeover Example for Function Setting]

Figure 7:
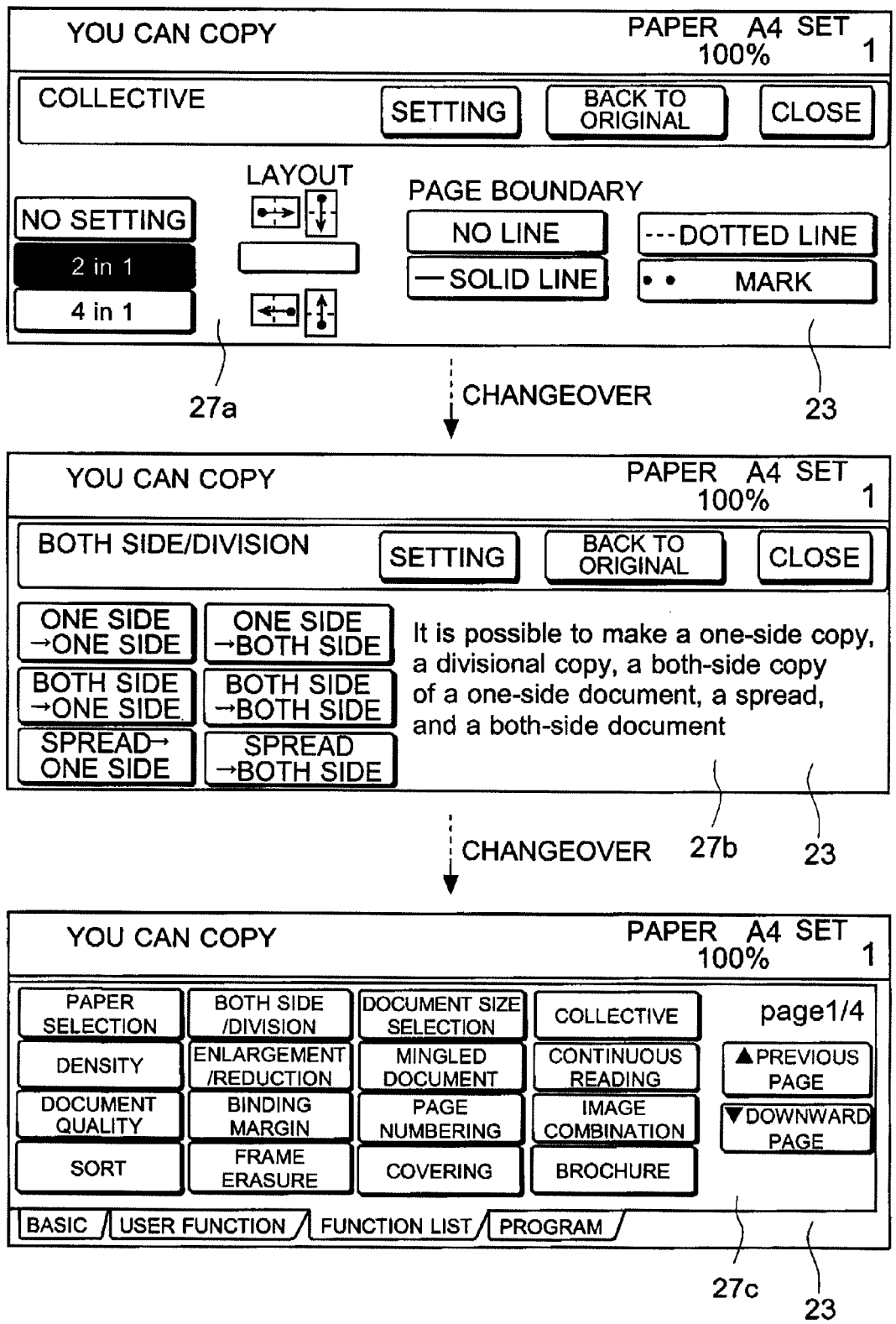
FIG. 7 is a view to explain a changeover example of display on a liquid crystal display portion according to an embodiment.
Figure 8:
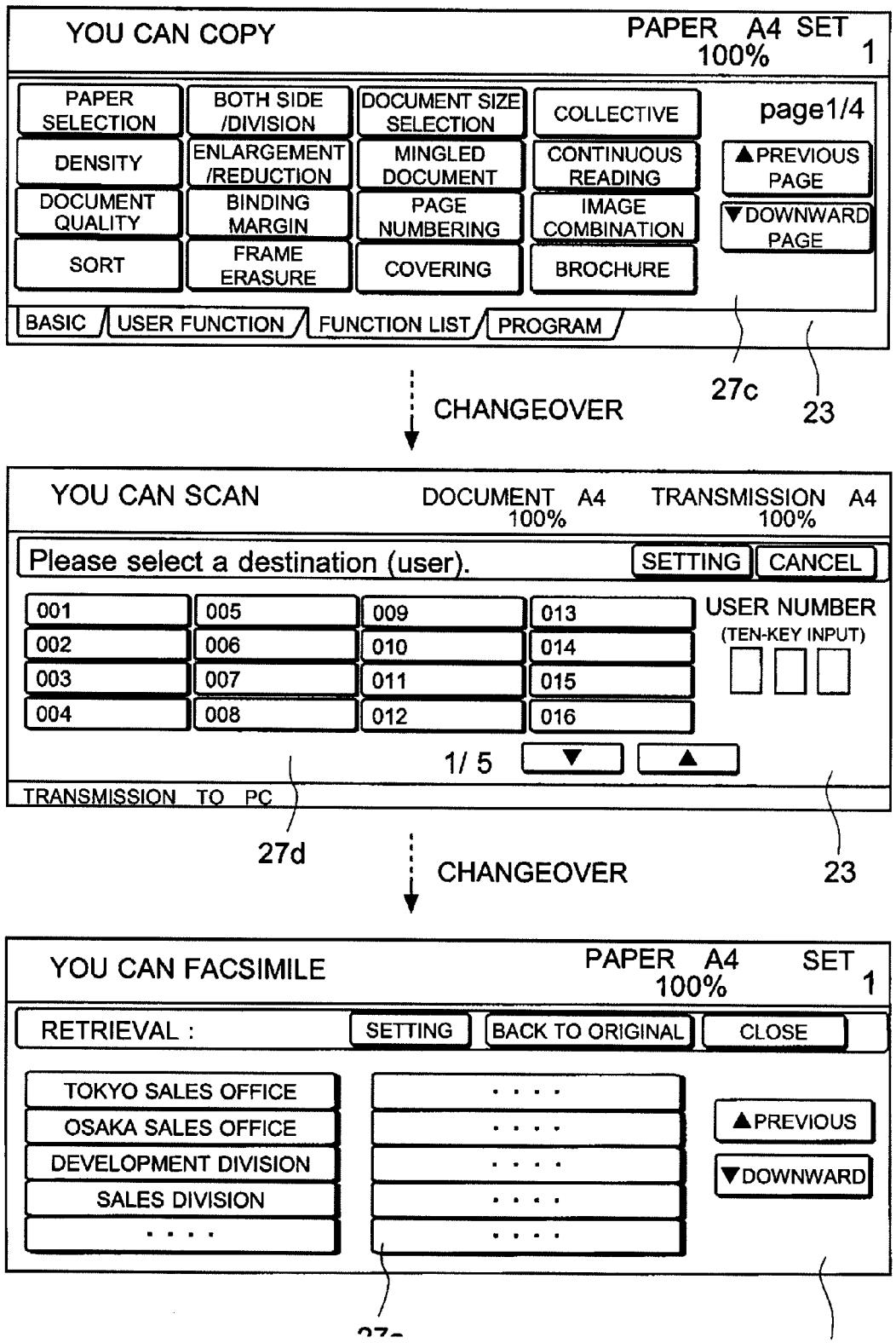
FIG. 8 is a view to explain a changeover example of display on a liquid crystal display portion according to an embodiment.

Next, advantages of display changeovers for function settings depending on the exposure state of the IC card 7 to the reader/writer 6 in the embodiment are explained based on FIGS. 7 and 8. FIGS. 7 and 8 are views to explain changeover examples of display on the liquid crystal display portion 23 according to the embodiment of the present invention.

FIG. 7 shows changeover examples of copy-function display screens related to copy functions of the multi-function machine 1 in the embodiment, that is, examples of a setting screen 27a displayed on the top stage for the "2 in 1 function," a setting screen 27b displayed on the center stage for the "both-side print function," and on the bottom stage, a function setting screen 27c situated on the substantially highest layer of the copy function screens. In this example, the display of the liquid crystal display portion 23 is changed from the top stage to the bottom stage via the center stage. In other words, a registration is performed, in which the setting screen 27a for the "2 in 1 function," the setting screen 27b for the both-side print function, and the function selection screen 27c are changed in order.

For example, if it is detected that the reader/writer 6 can intermittently communicate with the IC card 7, the reader/writer 6 is able to detect that the user is repeating the operation of exposing the IC card 7 to the reader/writer 6. Besides, the reader/writer 6 is able to detect that the IC card 7 is kept being exposed to the reader/writer 6 by continuing to communicate with the same IC card 7. A signal that gives notice of the exposed state of the IC card 7 is able to be inputted into the control portion 8.

Accordingly, in the multi-function machine 1 in the embodiment, it is detected that the IC card 7 is repeatedly exposed or kept being exposed to the reader/writer 6, and the display on the liquid crystal display portion 23 is changed based on the display setting data. If the IC card 7 is kept being exposed, it is possible to change the display on the liquid crystal display portion 23 at predetermined time intervals (e.g., 0.5 to a few seconds, for example). Advantages of the display changeovers are explained below.

Usually, for example, to carry out successively the settings of the "2 in 1 function" and the "both-side print function," it is necessary to start from the initial screen to the setting screen 27a for the "2 in 1 function" to set the "2 in 1 function," then take the trouble to return to an upper layer, reach the setting screen 27b for the both-side print function and set the both-side print function. Accordingly, it is necessary to operate the liquid crystal display portion 23 a plurality of times.

However, in the present invention, because the setting screens for the functions that each user frequently uses are able to be registered as the display setting data, the setting screen 27a for the "2 in 1 function" is changed to the setting screen 27b for the both-side copy function by counting the number of exposures to the reader/writer 6 or an extremely easy operation of continuing exposure. In other words, because the display on the liquid crystal display portion 23 is able to be changed successively depending on the exposure state of the IC card 7, it is possible to quickly and easily reach a desired function setting screen. Because it is not general that a user uses equally all the functions of the multi-function machine 1, but the user tends to use frequently some functions only, if a plurality of function setting screens (e.g., 1 to more than 10) are registered, most of the function settings that the user performs can be covered.

Considering a necessity to return to the highest layer, for example, in a case and the like where a function that is not registered is used, as shown on the bottom stage in FIG. 7, the function setting screen 27c (here, the screen on the highest layer for the setting of the copy function) present on the substantially highest layer may be included as a screen that can be registered. Besides, for example, if the screen changeovers depending on the display setting data are completed to the last, control to display the function selection screen 27c on the substantially highest layer may be always carried out.

Next, display changeovers for function settings in different categories of copy, FAX and scan are explained based on FIG. 8.

There is a case where a user carries out in series a plurality of operations, for example, "copy, then scan," "copy, then FAX transmission." In the multi-function machine 1 in the embodiment, if a display order of setting screens is registered as display setting data, it is possible to change the current screen to a setting screen for a function in a completely different category (in FIG. 8, display setting data are so registered that the screen changes to the function selection screen 27c, the scan destination selection screen 27d, and the FAX destination selection screen 27e in order).

For example, in a case where scan is performed after copy, conventionally, after completion of the copy, the user operates the operation panel 2 to take the trouble to display the setting screen on the highest layer for the scan, then goes down to a lower layer to perform the function setting. However, in the present invention, as shown in FIG. 8, it is possible to directly jump to the destination selection screen for transmission of scanned image data. Besides, the user can carry out the changeover by simply exposing the IC card 7 to the reader/writer 6 again. Further, in a case where the user desires to use the FAX function, if the user registers the FAX destination selection screen 27e in advance, the user can display the FAX destination selection screen 27e by simply exposing the IC card 7 to the reader/writer 6.

[Display Changeover and Control Flow]

Figure 9:
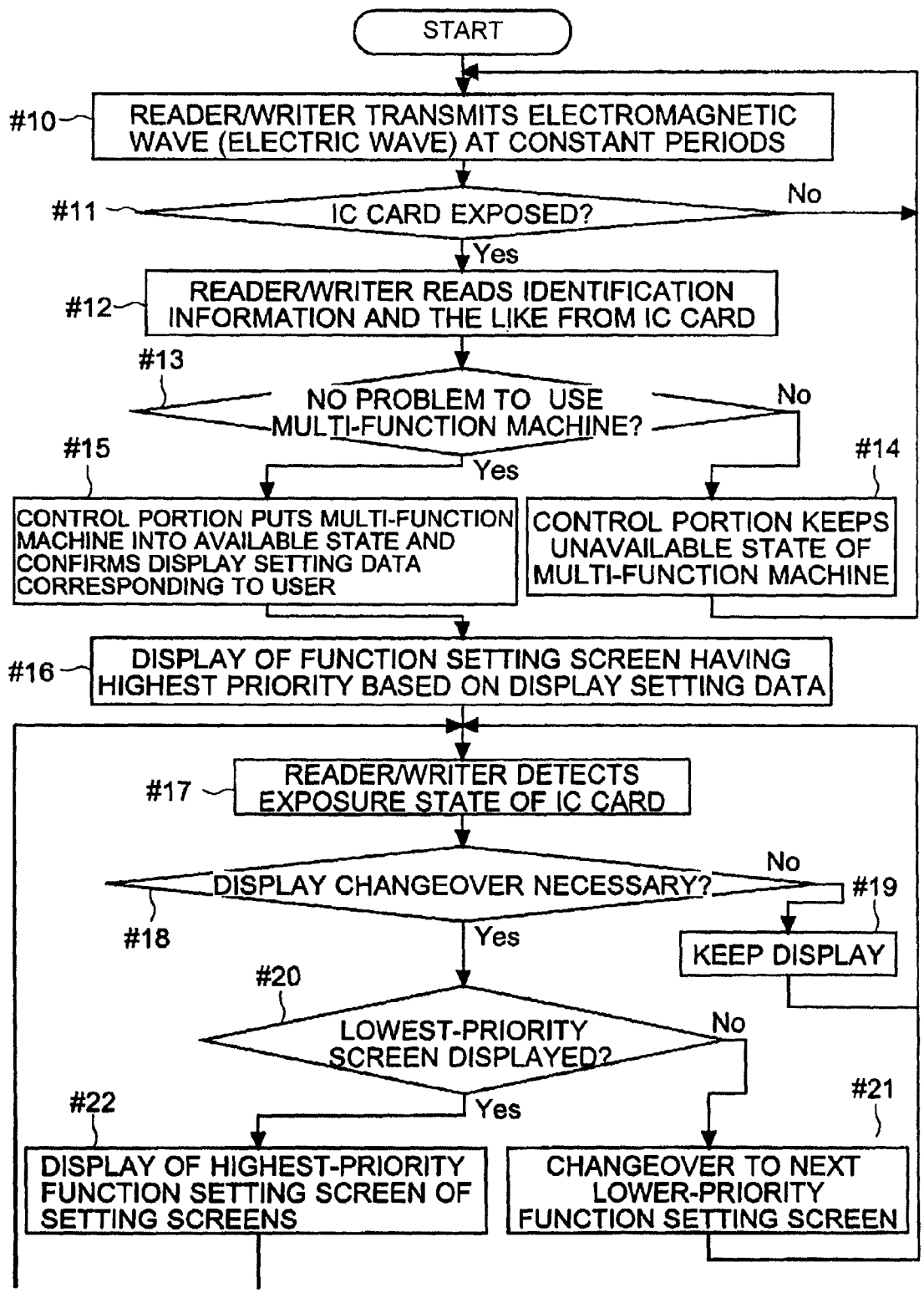
FIG. 9 is a view to explain a flow chart to explain a flow example of a display changeover on a liquid crystal display portion according to an embodiment.

Next, examples of the display changeover and control flow on the liquid crystal display portion 23 according to the embodiment of the present invention are explained based on FIG. 9. FIG. 9 is a view to explain a flow chart to explain a flow example of a display changeover on the liquid crystal display portion 23 according to the embodiment of the present invention.

First, at the "START" in FIG. 9, the multi-function machine 1 has no users and is in the unavailable state. Here, to detect that the IC card 7 is exposed to the reader/writer 6, the reader/writer 6 emits an electromagnetic wave (an electric wave) at constant periods (the step #10), and checks whether or not the IC card 7 is exposed (the step #11). The multi-function machine 1 keeps the unavailable state until the IC card 7 is exposed to the reader/writer 6 (No in the step #11).

If the IC card 7 is exposed to the reader/writer 6 (Yes in the step #11), the reader/writer reads the identification information from the IC card 7 (the step #12). Based on the identification information, the authorization portion 9 determines whether or not it is a problem to give use permission to the owner of the IC card 7 (the step #13). If the authorization data that the authorization portion 9 has do not contain data that is identical to the obtained identification information (No in the step #13), the control portion 8 keeps the unavailable state of the multi-function machine 1 (the step #14), then returns to the step #10.

On the other hand, if the authorization portion 9 determines that it is no problem to give use permission (Yes in the step #13), the determination result and the data to identify the user are transmitted to the control portion 8, and the control portion 8 puts the multi-function machine 1 into the available state, and checks for display setting data corresponding to the user (the step #15). If the display setting data are stored in the storage portion 82, the display setting data are obtained from the storage portion 82. If the display setting data are stored in the server 300, the display setting data are obtained from the server 300. If the display setting data are stored in the IC card 7, the reader/writer 6 obtains the display setting data together with the identification information from the IC card 7, and the display setting data and the identification information are inputted into the control portion 8 via the authorization portion 9.

Based on the confirmed display setting data, the control portion 8 forces the liquid crystal display portion 23 to display the function setting screen having the highest priority (order) (the step #16). In this situation, the reader/writer 6 emits an electromagnetic wave at constant periods to communicate with the IC card 7, and detects the exposure state of the IC card 7 to the reader/writer 6 (the step #17).

The control portion 8 checks if the IC card 7 is exposed again or is kept being exposed and confirms a necessity for a display changeover on the liquid crystal display portion 23 (the step #18). Here, although the reader/writer 6 and the control portion 8 in the embodiment check whether or not the IC card 7 is exposed again or is kept being exposed, it may be checked only whether or not the IC card 7 is exposed again, or only whether or not the IC card 7 is kept being exposed.

If the control portion 8 does not admit a necessity for a display changeover on the liquid crystal display portion 23 (No in the step #18), the control portion 8 keeps the display on the liquid crystal display portion 23 (the step #19). If the exposure state of the IC card 7 being exposed again or the exposure state of the IC card 7 being kept exposed is confirmed (Yes in the step #18), the control portion 8 checks whether or not the current displayed screen is the lowest priority screen of all the function setting screens for which the display setting data are set (the step #20). If the lowest priority screen is not displayed (No in the step #19), the control portion 8 changes the current screen to the next lower-priority function setting screen based on the display setting data (the step #21). In other words, the control portion 8 changes the display on the operation panel 2 according to the display setting data of the user identified by the identification information and to the exposure state of the IC card 7 being exposed. As for the exposure state of the IC card 7, the control portion 8 detects the exposure state in which the IC card 7 is exposed to the reader/writer 6 again or the exposure state in which the IC card 7 is kept being exposed, and forces the operation panel to change the display.

On the other hand, if the lowest priority screen is displayed (Yes in the step #20), it is thought that the function which the user desires to use is different from the function registered corresponding the display setting data or the display on the liquid crystal display portion 23 is erroneously changed. In this case, the highest-priority function setting screen of the setting screens is displayed (the step #22). In other words, if the operation panel 2 (the liquid crystal display portion 23) displays all setting screens including the last setting screen, the control portion 8 forces the operation panel 2 (the liquid crystal display portion 23) to display the first and following screens (return to the first step). If the function that the user desires to use is not present in the function that is set with the display setting data, the user operates the operation panel 2 again to reach the target function setting screen.

To prevent unauthorized use of the multi-function machine 1 in the embodiment, the control portion 8 checks time and if there is no input into the operation panel 2 for a predetermined time (e.g., for several tens of seconds or a few minutes), the multi-function machine 1 goes into the unavailable state. Accordingly, at the time the multi-function machine 1 goes into the unavailable state, the display changeover control is terminated. If the user exposes the IC card 7 to the reader/writer 6 in order to use the multi-function machine 1, the control shown in FIG. 9 is started.

As described above, in the structure of the present invention, because the display on the display input portion (the operation panel 2, the liquid crystal display portion 23) is changed according to the exposure state of the storage medium (the IC card 7) to the radio communication portion (the reader/writer 6), it is possible to change the display on the display input portion without a complicated operation such as passing through layers on the display input portion and the like. Besides, because the display setting data that represent a display order and contents for the function setting screens that each user frequently uses are set, it is possible to change the display on the display input portion by using the identification information and the display setting data. Accordingly, each user is able to not only display selectively only the function setting screens that the user frequently uses but also jump quickly to a lower-layer function setting screen or to a function setting screen present in a completely different category.

Besides, each time the storage medium is exposed to the radio communication portion, the control portion 8 forces the display input portion to change the display, and during the time the storage medium is kept being exposed to the radio communication portion, the control portion 8 continues to force the display input portion to keep changing the display, thereby allowing the user to change the display without performing any operation on the display input portion. In addition, because the control portion 8 is able to store the display setting data not into the storage portion 82 but into the storage medium via the radio communication portion, the user is able to display the function setting screens used frequently on the display input portion without reentering the display setting data even if a different image forming apparatus is used or the display setting data stored in the storage portion 82 are lost because of a glitch.

Besides, the authorization portion 9 is disposed, which checks whether or not it is possible to use the image forming apparatus based on the identification information that the radio communication portion receives from the storage medium, thereby it is possible to incorporate the authorization function into the image forming apparatus. When the display input portion displays all setting screens including the last setting screen, because the first and following setting screens are able to be displayed successively again, it is possible to reach a target setting screen again easily by simply exposing the storage medium even if the display is erroneously changed. Even in the multi-function machine 1 that is complicated to operate, the user is able to set a function easily and quickly. Because the storage medium is the IC card 7 and the radio communication portion is the reader/writer 6 that carries out reading and writing of data from and to the IC card 7, it is possible to repeat the operation of exposing the IC card 7 to the reader/writer 6 or keeping the exposure. Besides, it is possible to think that the present invention is an invention of a system which comprises the storage medium and the image forming apparatus.

Hereinafter, other embodiments are described. In the embodiment described above, the user inputs a display changeover order. However, another embodiment may be employed, in which the manufacturer investigates the actual use conditions and the like, prepares predetermined display setting data and stores the data into the storage portion 82 and the like in advance, the display setting data are used to change the display depending on the exposure state of the IC card 7 or the like. Besides, another embodiment may be employed, in which a usual initial screen is displayed in the time of authorization, then the screen is changed based on the display setting data.

In the embodiment described above, a passive-type IC card is used as the IC card 7. However, an active-type IC card that has its own battery therein may be used as the IC card 7.

The embodiments are described above. However, the present invention is not limited to the embodiments, and various modifications can be made within the scope not departing from the spirit of the present invention.

The present invention is applicable to a reader/writer, and also to an image forming apparatus and an image forming system such as a printer, a copying machine and a multi-function machine that include a reader/writer for reading data from a storage medium such as an IC card and the like over radio communication and perform use control.

What is claimed is:

1. An image forming system, comprising:
a plurality of storage mediums each of which stores at least identification information for identifying a user;
an image forming apparatus that includes a radio communication portion that transmits and receives data to and from the storage medium over radio communication; a display input portion that displays a function able to be set on a screen thereof and receives a function setting; and a control portion for controlling operation of the apparatus; and
a storage portion that is disposed inside or outside the image forming apparatus and stores display setting data that represent a display order and display contents which are changed according to an exposure state of the storage medium for each user, wherein
the display input portion receives registration and update inputs of display setting data that represent a display order in which display is changed according to an exposure state of the storage medium,
the storage portion stores the display setting data for each user, and
the control portion, based on the display setting data, forces the display input portion to change display in the order defined by the display setting data based on the display setting data of a user identified by the identification information whenever the storage medium is exposed to the radio communication portion.

2. The image forming system according to claim 1, wherein the display order is a priority order of setting screens.

3. An image forming apparatus, comprising:
a radio communication portion that transmits and receives data over radio communication to and from a storage medium in which identification information for user identification is stored;
a storage portion that stores display setting data that represent a display order and display contents which are changed according to an exposure state of the storage medium for each user;
a display input portion that displays a function setting screen and receives a function setting, and receives registration and update inputs of the display setting data; and
a control portion that controls operation of the apparatus and forces the display input portion to perform display changeover in the order defined by the display setting data based on the display setting data of a user identified by the identification information whenever the storage medium is exposed to the radio communication portion.

4. The image forming apparatus according to claim 3, wherein the storage medium is an IC card, and the radio communication portion is a reader/writer that performs reading and writing of data from and to an IC card.

5. The image forming apparatus according to claim 3, wherein the control portion forces the display input portion to keep changing the display in the order defined by the display setting data based on the display setting data of the user identified by the identification information during the time when the storing medium is exposed to the radio communication portion.

6. The image forming apparatus according to claim 3, wherein
the storage portion stores a display order of function setting screens of a copy function, a scan function, and a FAX function that are different from one another in category; and
the control portion forces the display input portion to perform a display changeover in the order defined by the display setting data based on the display setting data of the user identified by the identification information.

7. The image forming apparatus according to claim 3, wherein the control portion does not store the display setting data into the storage portion but forces the radio communication portion to store the display setting data into the storage medium, the radio communication portion obtains the identification information and the display setting data from the storage medium, the obtained display setting data are inputted into the control portion, and the control portion, based on the inputted display setting data, forces the display input portion to change the display depending on the exposure state of the storage medium.

8. The image forming apparatus according to claim 3, further comprising an authorization portion, which based on the identification information which the radio communication portion obtains from the storage medium, determines whether or not the user has permission to use the image forming apparatus and there is a problem permitting the use, wherein the control portion holds the image forming apparatus in an unavailable state in principle, and puts the image forming apparatus into an available state if the authorization portion determines that there is no problem permitting the user to use the image forming apparatus.

9. The image forming apparatus according to claim 3, wherein the display order is a priority order of setting screens.

10. The image forming apparatus according to claim 3, wherein if the display input portion displays all setting screens including the last setting screen, the control portion forces the display input portion to perform successively the display again from the first setting screen.

11. The image forming apparatus according to claim 3, wherein the image forming apparatus is a multi-function machine that comprises some of a plurality of functions of copy function, print function, scan function, and FAX function, or all of the functions.

* * * * *